US012700773B2

(12) United States Patent　　　(10) Patent No.:　US 12,700,773 B2
Lee et al.　　　　　　　　　　　　　(45) Date of Patent:　　Aug. 4, 2026

(54) ROTOR MODULE WITH COOLING STRUCTURE

(71) Applicant: HYUNDAI MOBIS CO., LTD., Seoul (KR)

(72) Inventors: Sung Wook Lee, Yongin-si (KR); Tae Wook Ha, Yongin-si (KR); Byung Ryel In, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 201 days.

(21) Appl. No.: 18/398,381

(22) Filed: Dec. 28, 2023

(65) Prior Publication Data

US 2024/0258879 A1　　Aug. 1, 2024

(30) Foreign Application Priority Data

Jan. 27, 2023　　(KR) ......................... 10-2023-0011039

(51) Int. Cl.
　　*H02K 9/06*　　　　(2006.01)
　　*H02K 1/32*　　　　(2006.01)
　　*H02K 9/16*　　　　(2006.01)
　　*H02K 9/193*　　　(2006.01)
(52) U.S. Cl.
　　CPC ................. *H02K 9/06* (2013.01); *H02K 1/32* (2013.01); *H02K 9/16* (2013.01); *H02K 9/193* (2013.01); *H02K 2205/09* (2013.01)

(58) Field of Classification Search
　　CPC ........ H02K 1/32; H02K 2205/09; H02K 9/06; H02K 9/193; H02K 1/325; H02K 9/16
　　See application file for complete search history.

(56) References Cited

U.S. PATENT DOCUMENTS

2020/0378281 A1*　12/2020　Tomescu ................ B64D 33/08
2021/0384801 A1*　12/2021　Oh .......................... H02K 1/276
2022/0294294 A1*　9/2022　Choi ........................ H02K 9/19

FOREIGN PATENT DOCUMENTS

KR　　10-2022-0096306 A　　7/2022

* cited by examiner

*Primary Examiner* — Tulsidas C Patel
*Assistant Examiner* — Robert E Mates
(74) *Attorney, Agent, or Firm* — Morgan, Lewis & Bockius LLP

(57)　　　　　　ABSTRACT

The present invention relates to a rotor, and more particularly, to a rotor with increased cooling efficiency. According to the present invention, a rotor module may maximize a cooling effect by allowing cooling oil to flow inside a rotor to directly cool the rotor and directly cool a rotor heating unit, thereby stably implementing specifications requiring high power or a high current density, may be designed to scatter the cooling oil inside the rotor to the outside to cool areas around an end coil of a drive motor at the same time, and may reduce the number of pats by removing cooling parts for cooling the existing stator, thereby reducing costs.

14 Claims, 9 Drawing Sheets

100

110

111     112

ROTOR MODULE WITH COOLING STRUCTURE

CROSS-REFERENCE TO RELATED APPLICATIONS

This application claims priority under 35 U.S.C. § 119 to Korean Patent Application No. 10-2023-0011039, filed on Jan. 27, 2023, in the Korean Intellectual Property Office, the disclosure of which is incorporated herein by reference in its entirety.

TECHNICAL FIELD

The following disclosure relates to a rotor, and more particularly, to a rotor with increased cooling efficiency.

BACKGROUND

A conventional drive motor includes a stator coil part, which is a main heating element, and a cooling pipe for spraying cooling oil to cool heat of a part surrounding the heating element. In this case, oil scattered through a cooling pipe cools a motor as the heating element, hot oil to which heat is transferred is stored on a bottom of the motor, and the oil stored on the bottom of the motor is induced to a reducer through an internal housing flow path connecting the motor and the reducer and thus is used to lubricate the reducer by churning of the reducer. In addition, the conventional drive motor employs a structure in which oil stored in the housing of the reducer moves to an external heat exchanger through a pump, and oil cooled by exchanging heat with cooling water circulates again to cool the motor.

The conventional method of oil-cooling the drive motor is easy to cool upper/lower end portions of a stator core and a coil. However, to cool the drive motor by the conventional method, a separate "cooling pipe" is required for cooling. The conventional method has a problem in that the number of parts increases according to the required pipe, and it is difficult to cool the stator core and a rotor core.

RELATED ART DOCUMENT

Patent Document (Patent Document 1) Korean Patent Laid-Open Publication No. 10-2022-0096306 "STRUCTURE FOR PROJECTING COOLING OIL" Dec. 31, 2020

SUMMARY

An embodiment of the present invention is directed to providing a rotor module with a cooling structure capable of maximizing a cooling effect by allowing cooling oil to flow inside a rotor to directly cool the rotor and directly cool a rotor heating unit, and thus, stably implementing specifications requiring high power or a high current density.

In addition, an embodiment of the present invention is directed to providing a rotor module with a cooling structure capable of reducing costs and solving a thermal imbalance between a stator and a rotor by being easily driven even if a low-end permanent magnet of a rotor is used.

Further, an embodiment of the present invention is directed to providing a rotor module with a cooling structure capable of cooling areas around an end coil of a drive motor at the same time by being designed to scatter cooling oil inside a rotor to the outside, and reducing the number of parts by removing cooling parts for cooling the existing stator and thus reducing costs.

In one general aspect, a rotor module with cooling structure includes: a cylindrical rotor core with a hollow inside; and a rotor shaft that is fitted and fixed to a center of the rotor core, includes a cooling fluid flow path filled with a cooling fluid therein, and rotates about a central axis of the rotor core, in which the rotor core includes a communication groove that is formed to a predetermined depth on an inner side surface, the rotor shaft includes a first discharge flow path having one end communicating with the cooling fluid flow path and the other end communicating with the rotor shaft and the communication groove of the rotor core, and the cooling fluid flow path has one end open and the other end closed.

The rotor core may include a second discharge flow path etched to a predetermined depth between one end surface and the other end surface and the rotor shaft.

The communication groove may be formed in a straight line to connect one end surface and the other end surface of the rotor core.

The communication groove may be formed outside a magnetic field area formed by a magnet of the rotor core.

The communication groove may include: a first groove that is formed to a predetermined depth on a surface of an inner surface of the rotor core; and a plurality of second grooves that are formed in contact with the first groove and formed in a vertical direction of the first groove.

The first discharge flow path may include two or more, and the first discharge flow paths may be formed to be spaced apart from each other by a predetermined distance along the central axis of the rotor core.

Each of the first discharge flow paths may be formed to have a wider cross-sectional area toward the other end.

A center of the first discharge flow path may be spaced apart from the center of the cooling fluid flow path by a predetermined distance in a vertical direction of the central axis of the rotor core.

The rotor module may further include: a cooling fluid injection unit that is fitted into the cooling fluid flow path of the rotor shaft to fill the cooling fluid inside the cooling fluid flow path.

The cooling fluid injection unit may have a protruding part formed on an outer surface in contact with the inner surface of the cooling fluid flow path, the protruding part may be formed so that a surface facing an outside of the cooling fluid flow path is perpendicular to the central axis of the rotor core and a surface facing an inside of the cooling fluid flow path is inclined at a predetermined angle, not perpendicular or parallel to the central axis of the rotor core.

Two or more protruding parts may be formed on the surface of the cooling fluid injection unit, and each of the protruding parts may be formed in a row along the central axis of the rotor core.

The cooling fluid injection unit may further include a sealing part fitted between one end of the cooling fluid flow path.

In another general aspect, a motor includes: the rotor module of claim 1; and a stator module that has the same axis with the rotor module and surrounds the rotor module.

In still another general aspect, a motor system includes: the rotor module of claim 1; a stator module that has the same axis with the rotor module and surrounds the rotor module; and a cooling system that injects the cooling fluid through the cooling fluid flow path of the rotor module.

DETAILED DESCRIPTION OF MAIN ELEMENTS

Figure 1:
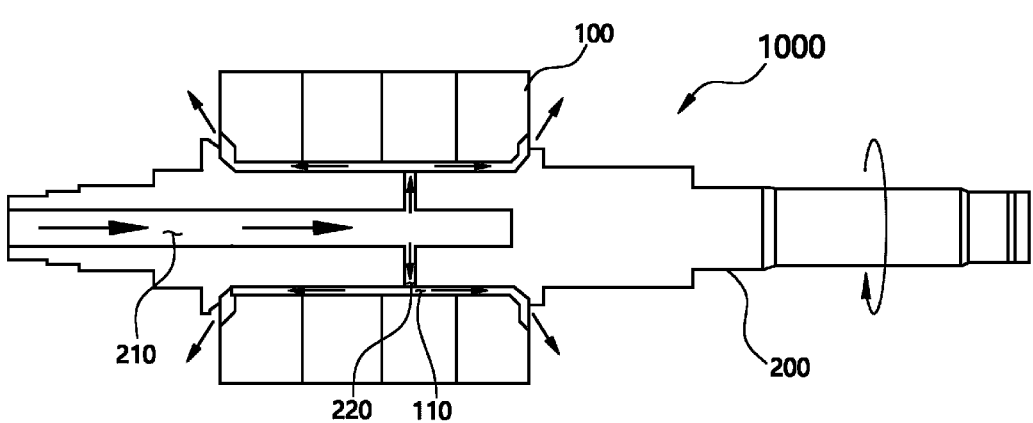
FIG. 1 is a transverse cross-sectional view of a rotor module with a cooling structure of the present invention.

1000: Rotor module with a cooling structure
100: Rotor core
110: Communication groove
111: First groove
112: Second groove
120: Second discharge flow path
200: Rotor shaft
210: Cooling fluid flow path
220: First discharge flow path
300: Cooling fluid injection unit
310: Protruding part

DETAILED DESCRIPTION OF EMBODIMENTS

Hereinafter, the technical spirit of the present invention will be described in more detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Hereinafter, a basic configuration of a rotor module 1000 with a cooling structure of the present invention will be described with reference to FIGS. 1 and 2.

Figure 2:
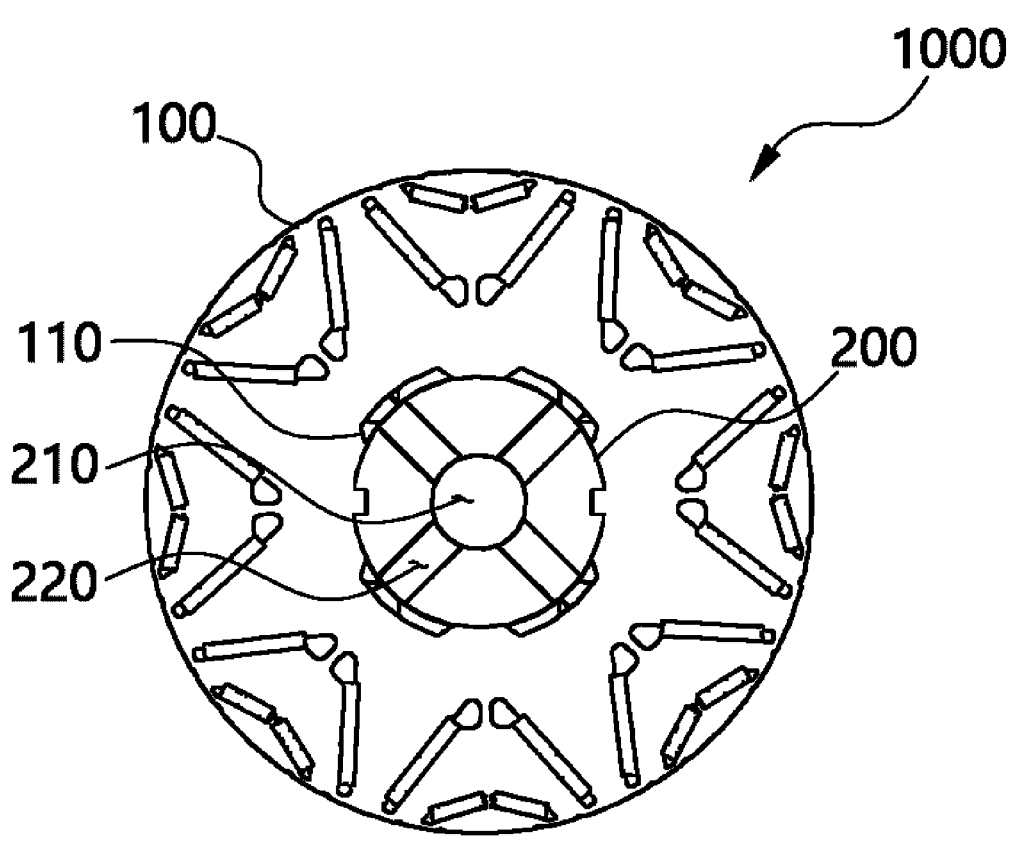
FIG. 2 is a longitudinal cross-sectional view of the rotor module with a cooling structure of the present invention.

As illustrated in FIG. 1, the rotor module 1000 with a cooling structure of the present invention may include a cylindrical rotor core 100 with a hollow inside and a rotor shaft 200 fitted and fixed to a center of the rotor core 100. The rotor shaft 200 may rotate about a central axis of the rotor core 100. Accordingly, the rotor shaft 200 and the rotor core 100 fixed to the rotor shaft 200 may rotate about the central axis of the rotor core 100 together.

The rotor shaft 200 may include a cooling fluid flow path 210 in which a cooling fluid is filled. In this case, the cooling fluid filled may be cooling oil. As the cooling fluid flows inside the rotor shaft 200, the rotor shaft 200 and the rotor core 100 may be directly cooled, and the cooling effect may be maximized by directly cooling a heating point, thereby stably implementing specifications requiring high power or a high current density.

In addition, the rotor shaft 200 may have a half-hollow shape in which one end of the cooling fluid flow path 210 is open and the other end is closed. Accordingly, the cooling fluid may be transferred to a first discharge flow path 220 to be described later without loss of a flow rate of the cooling fluid. In more detail, as illustrated in FIG. 2, the rotor core 100 may include a communication groove 110 formed to a predetermined depth on an inner side surface, and the rotor shaft 200 may include the first discharge flow path 220 connecting a cooling fluid flow path 210 and a communication groove 110. That is, the first discharge flow path 220 preferably has one end communicating with the cooling fluid flow path 210 and the other end communicating with the rotor shaft 200 and the communication groove 110 of the rotor core 100. In this case, it is preferable that the cooling fluid flow path 210 of the rotor shaft 200 has one end open and the other end closed. In addition, the communication groove 110 may be formed to connect one end and the other end of the rotor core 100. The rotor core 100 and the rotor shaft 200 may be fitted and coupled to each other through the portion where the communication groove 110 is not formed, and the cooling fluid filled in the cooling fluid flow path 210 may be scattered to the outside of the rotor module 1000 with a cooling structure through the portion where the communication groove 110 is formed. Details will be described later.

The communication groove 110 and the first discharge flow path 220 may be formed to be spaced apart from each other by the same angle with respect to a central axis of rotation. (In the case of FIG. 2, four communication grooves 110 and four first discharge flow paths 220 are provided and spaced apart by 90° from each other.) Accordingly, the cooling fluid may be uniformly scattered in all directions.

Figure 3:
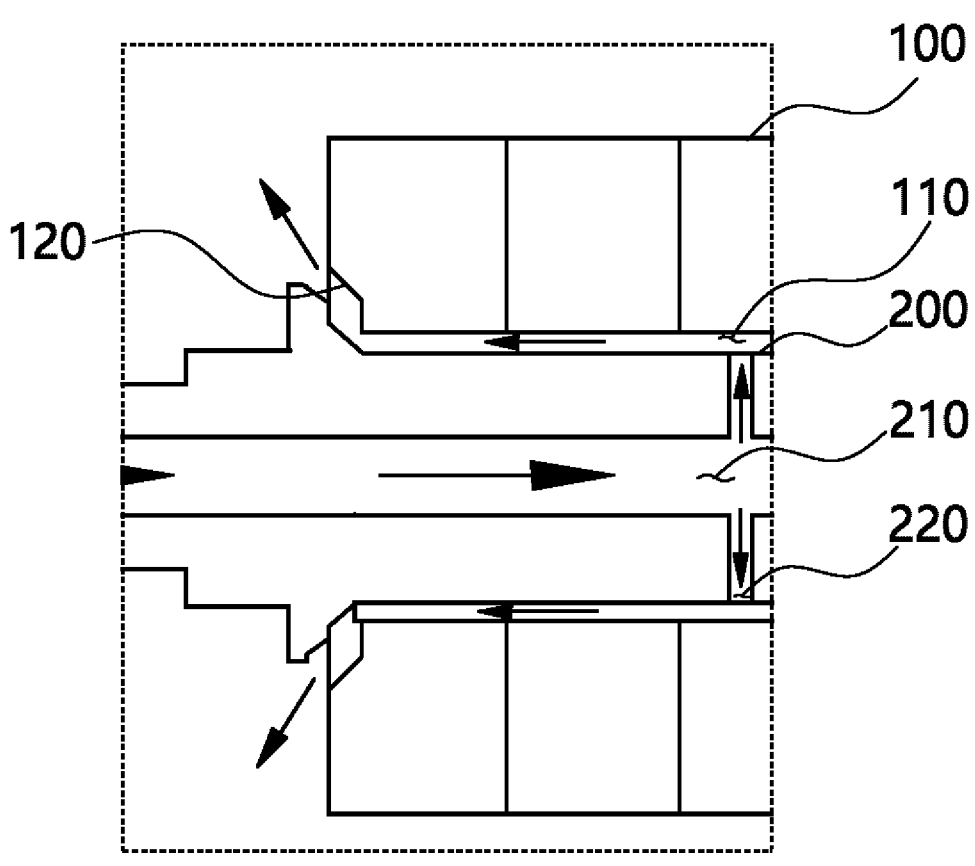
FIG. 3 is a partial cross-sectional view illustrating a second discharge flow path of the present invention.

By adopting such a structure, as illustrated in FIG. 3, according to the rotor module 1000 with a cooling structure of the present invention, the cooling fluid introduced into the cooling fluid flow path 210 may be dispersed to the outside of the rotor shaft 200 by a centrifugal force, and scattered to the outside of the rotor module 1000 with a cooling structure of the present invention through the first discharge flow path 220 and the communication groove 110. Accordingly, not only the central portion of the rotor module 1000 with a cooling structure filled with the cooling fluid, but also nearby parts coupled to the outside of the rotor module 1000 with a cooling structure may be simultaneously cooled, so the cooling efficiency may be significantly increased.

Hereinafter, the second discharge flow path 120 of the present invention will be described with reference to FIG. 3.

As illustrated in FIG. 3, it is preferable that the rotor core 100 includes the second discharge flow path 120 etched to a predetermined depth between one end surface and the other end surface and the rotor shaft 200. In more detail, it is possible to partially etch an edge where one end surface and the other end surface of the rotor core 100 come into contact with the rotor shaft 200, and accordingly, the fluid scattered through the communication groove 110 may be more easily scattered to the outside of the rotor the module 1000 with a cooling structure. The second discharge flow path 120 may be partially formed only in an area in contact with the communication groove 110, and an area in which the communication hole is not formed is formed to come into contact with the rotor shaft 200 to increase coupling performance between the rotor shaft 200 and the rotor core 100.

Hereinafter, the communication groove 110 and its embodiments of the present invention will be described in more detail with reference to FIGS. 4 and 5.

Figure 4:
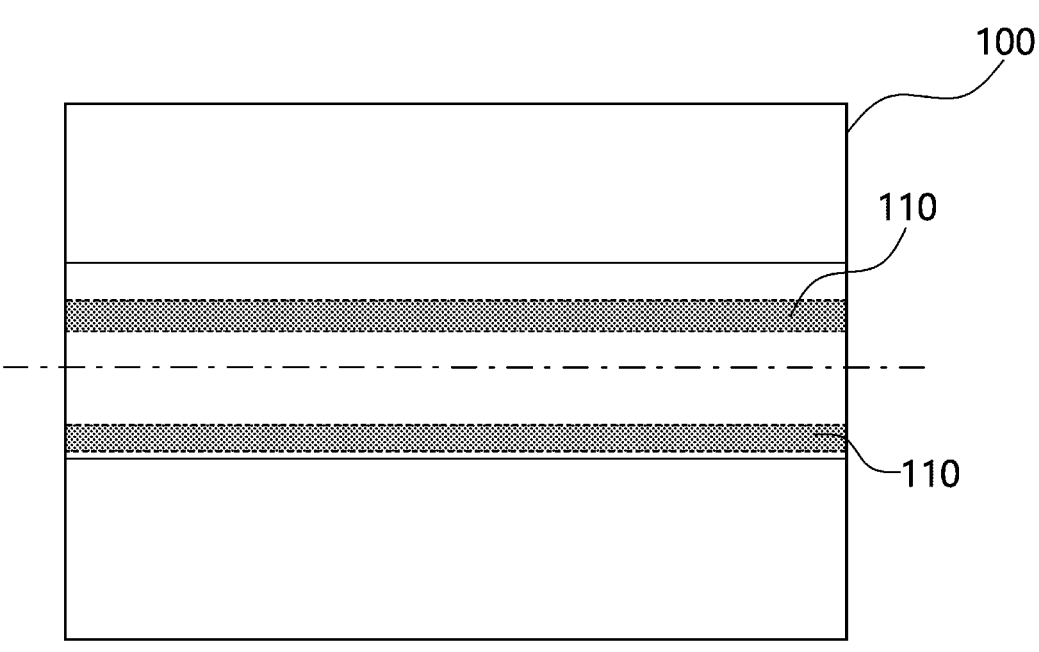
FIG. 4 is a plan view illustrating a communication groove of the present invention.

As illustrated in FIG. 4, the communication groove 110 may be formed in a straight line to connect one end surface and the other end surface of the rotor core 100. In this case, it is preferable that a width (longitudinal length in FIG. 5) and a depth of the communication groove 110 are constant. Accordingly, the cooling fluid transferred from the first discharge flow path 220 may be uniformly scattered to both one end and the other end of the rotor core 100.

Furthermore, in an additional embodiment of the communication groove 110, the width of the communication groove 110 may gradually increase toward one end surface or the other end surface of the rotor core 100. Accordingly, a flow velocity of the cooling fluid scattered to the outside through the communication groove 110 may be temporarily reduced at an outlet side, and the area where the cooling fluid is scattered may be controlled so that it is within the area near a cooling target (Ex>motor).

In this case, the communication groove 110 is preferably formed outside the magnetic field area formed by a magnet of the rotor core 100. A plurality of magnets are embedded inside the rotor core 100, and thus, a magnetic field area formed by each magnet is formed. The communication groove 110 is formed outside the area so that the flow of the cooling fluid scattered to the outside is not affected by the magnet of the rotor core 100, thereby uniformly and constantly scattering the cooling fluid.

Figure 5:
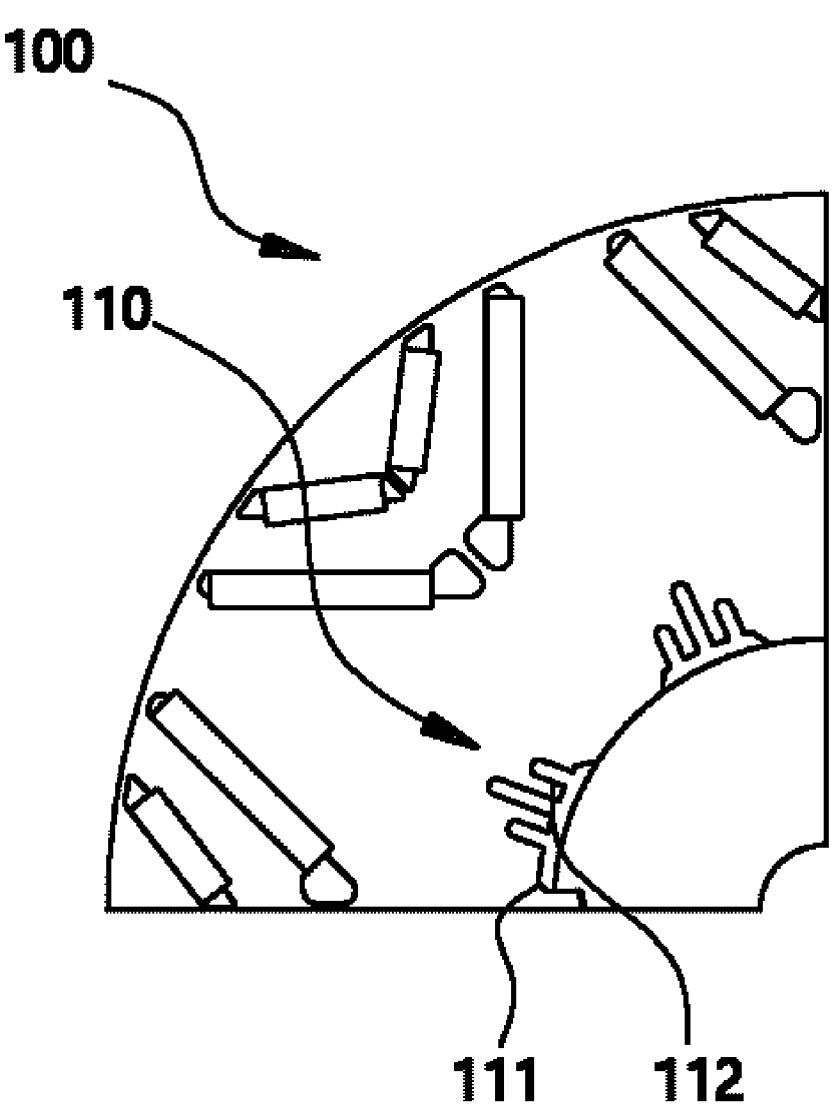
FIG. 5 is a partial cross-sectional view illustrating an embodiment of the communication groove of the present invention.

In addition, in the embodiment illustrated in FIG. 5, the communication groove 110 may include a first groove 111 formed to a certain depth on the surface of the inner surface of the rotor core 100 and a plurality of second grooves 112 formed in contact with the first groove 111 and formed in a vertical direction of the first groove 111. That is, the contact area between the cooling fluid and the rotor core 100 may increase by forming the communication groove 110 which comes into contact with the first discharge flow path 220 through which the cooling fluid is transferred, in the form of a fin, so the heat transfer efficiency may be increased and the cooling performance of the rotor core 100 may be increased.

Hereinafter, the first discharge flow path 220 and its embodiments of the present invention will be described in more detail with reference to FIGS. 6 to 8.

Figure 6:
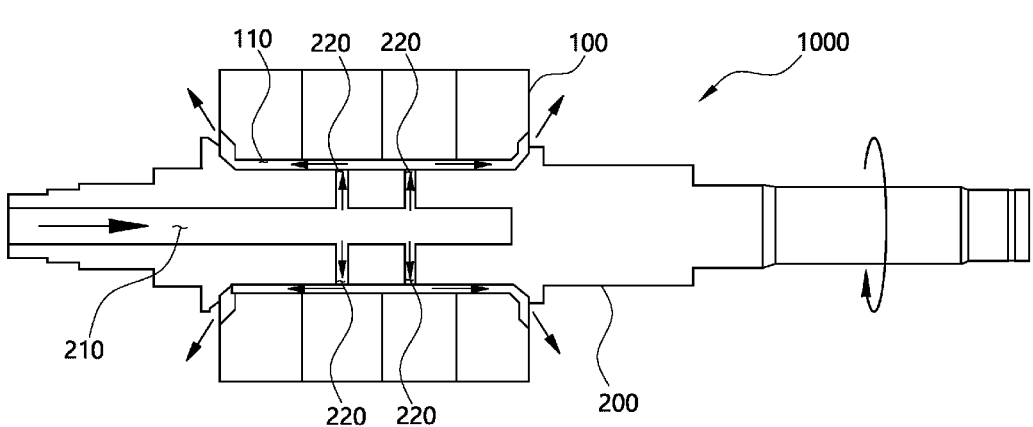
FIG. 6 is a transverse cross-sectional view illustrating a first embodiment of a first discharge flow path of the present invention.

In the first embodiment of the first discharge flow path 220 illustrated in FIG. 6, it is preferable that two or more first discharge flow paths 220 are included, and the first discharge flow paths 220 are formed to be spaced apart from each other by a predetermined distance along the central axis of the rotor core 100. In this case, when the rotor core 100 has a shape in which a plurality of rotor cores are stacked in a direction of a rotational axis, each first discharge flow path 220 may be formed to be spaced apart from each other to be located at the center of each rotor core 100 (relative to the rotational axis). By adopting such a shape, the cooling fluid may be uniformly sprayed for each part of the rotor core 100.

Figure 7:
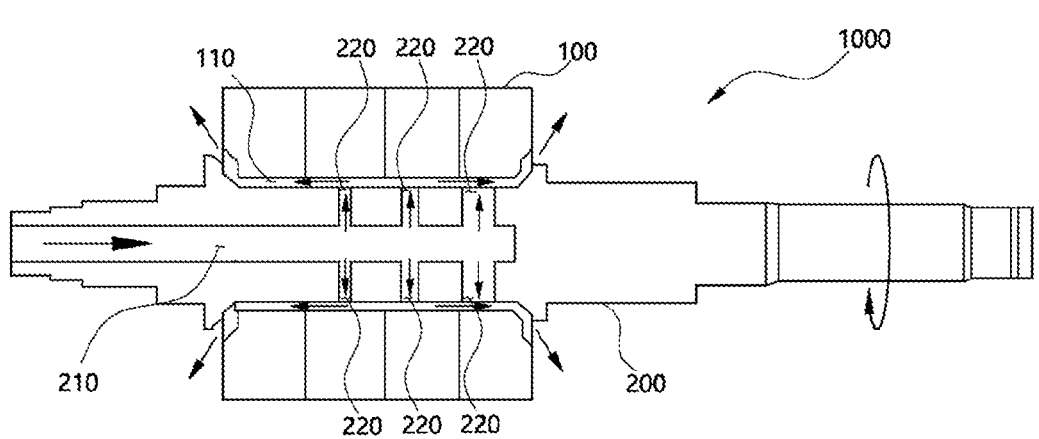
FIG. 7 is a transverse cross-sectional view illustrating a second embodiment of the first discharge flow path of the present invention.

In addition, in the second embodiment of the first discharge flow path 220 illustrated in FIG. 7, it is preferable that two or more first discharge flow paths 220 are included, and the first discharge flow paths 220 are formed to be spaced apart from each other by a predetermined distance along the central axis of the rotor core 100. In addition, each of the first discharge flow paths 220 may be formed to have a larger cross-sectional area toward the other end. That is, a cross-sectional area may be formed smaller on the open side to which the cooling fluid is injected, and may be formed larger on the closed side. Since a plurality of first discharge flow paths 220 are formed, the cooling fluid may be sequentially transferred from the first discharge flow path 220 close to one end of the cooling fluid flow path 210. In this case, as the cross-sectional area of the first discharge flow path 220 close to the other end of the cooling fluid flow path 210 is formed larger, it is possible to induce the cooling fluid so that the cooling fluid may flow to the other end side of the cooling fluid flow path 210, and more effectively adjust the cooling fluid to be scattered.

Figure 8:
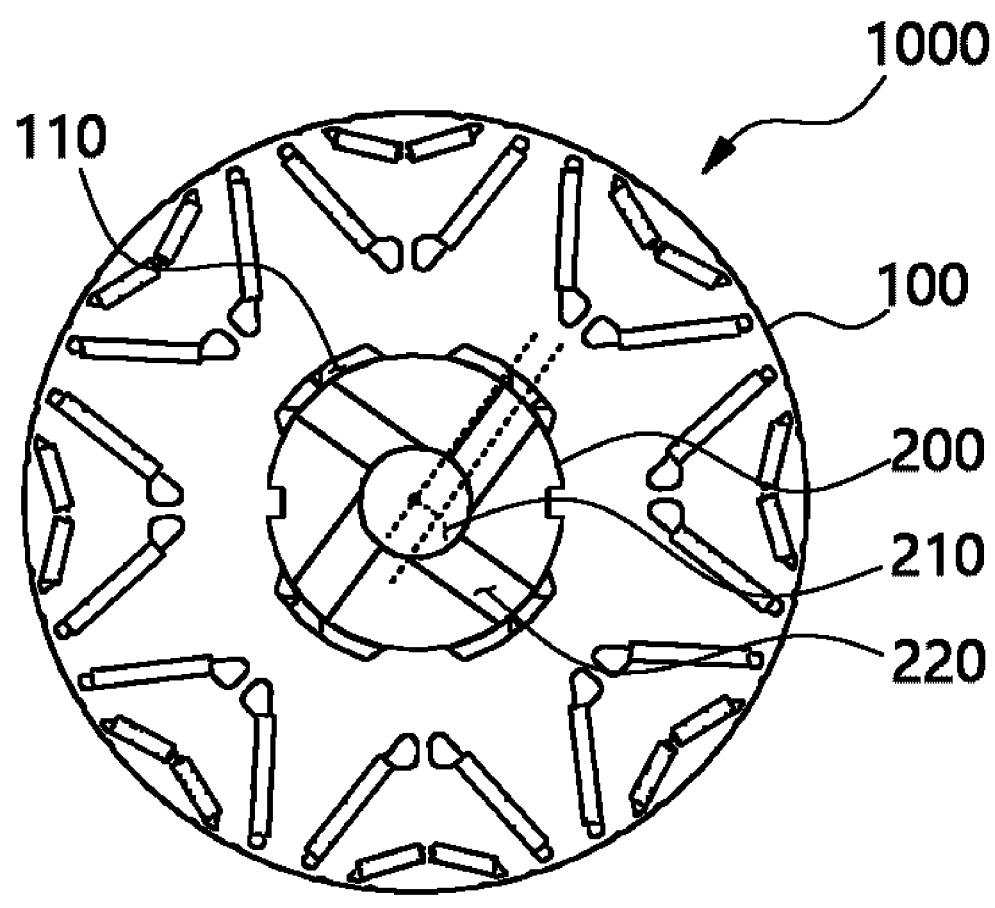
FIG. 8 is a transverse cross-sectional view illustrating a third embodiment of the first discharge flow path of the present invention.

In addition, in a third embodiment of the first discharge flow path 220 illustrated in FIG. 8, the center of the first discharge flow path 220 may be formed to be spaced apart by a predetermined distance from the center of the cooling fluid flow path 210 in the vertical direction of the central axis of the rotor core 100. That is, the first discharge flow path 220 may communicate with the cooling fluid flow path 210 at a tangential position when cut in a direction perpendicular to the rotation axis. When the rotor shaft 200 rotates, the cooling fluid rotates around the cooling fluid flow path 210. By adopting such a shape, the direction in which the cooling fluid is discharged through the first discharge flow path 220 may be parallel with the direction of rotating the circumference of the cooling fluid flow path 210, so the loss of the flow velocity of the cooling fluid may be minimized.

Hereinafter, a cooling fluid injection unit 300 of the present invention will be described with reference to FIG. 9.

The rotor module 1000 with a cooling structure of the present invention may further include the cooling fluid injection unit 300 that is fitted into the cooling fluid flow path 210 of the rotor shaft 200 to fill the inside of the cooling fluid flow path 210 with the cooling fluid. The position and phase of the cooling fluid injection unit 300 may be fixed. That is, even if the rotor core 100 and the rotor shaft 200 rotate, the position and phase may be maintained regardless of this. Accordingly, the vibration generated when the cooling fluid is injected may be minimized, and the cooling fluid may be smoothly supplied by being easily connected to an external cooling fluid storage tank even when the rotor module 1000 with a cooling structure is rotating, that is, while the motor is driving.

In this case, the cooling fluid injection unit 300 may further include a sealing part that is fitted between one end of the cooling fluid flow path 210 to minimize leakage between the coupling with the cooling fluid flow path 210. The sealing part may include an O-ring, a lip seal, a seal cover, an oil seal, a bearing, and the like.

Figure 9:
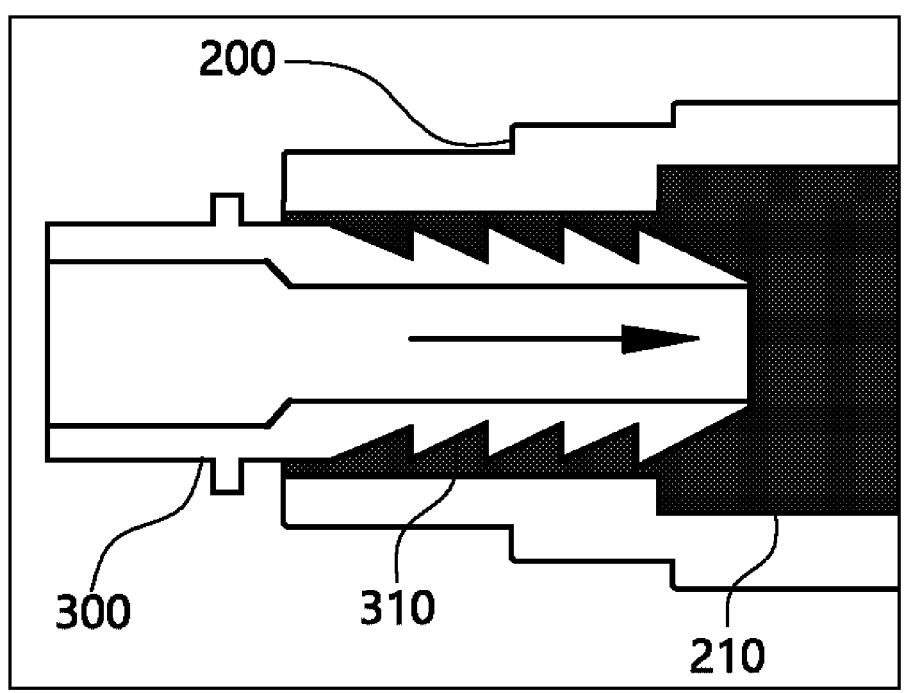
FIG. 9 is a partial cross-sectional view illustrating an embodiment of a cooling fluid injection unit according to the present invention.

In addition, in one embodiment illustrated in FIG. 9, the cooling fluid injection unit 300 has a protruding part 310 formed on an outer surface in contact with the inner surface of the cooling fluid path 210, and the protruding part 310 is preferably formed so that a surface facing an outside of the cooling fluid flow path 210 is perpendicular to the central axis of the rotor core 100, and a surface facing an inside of the cooling fluid flow path 210 is inclined by a predetermined angle rather than perpendicular or parallel to the central axis of the rotor core 100. In addition, two or more protruding parts 310 are formed on the surface of the cooling fluid injection unit 300, and each protruding part 310 is preferably formed in a row along the central axis of the rotor core 100.

Accordingly, even if a separate sealing part material is not included, when the rotor module 1000 with a cooling structure is rotating, that is, when the cooling is required, the cooling fluid may be prevented from leaking inside by the protruding part 310, and when the rotor module 1000 with a cooling structure is not rotating, the cooling fluid injection unit 300 may be easily separated because it is not fixed to the rotor module 1000 with a cooling structure. Accordingly, it is possible to increase the cooling fluid injection efficiency and ease of use. In addition, it is possible to minimize the decrease in efficiency of the motor due to the increase in mechanical loss (friction loss).

According to the rotor module with a cooling structure of the present invention having the above configuration, it is possible to maximize a cooling effect by allowing cooling oil to flow inside a rotor to directly cool a rotor and directly cool a rotor heating unit, and thus, stably implement specifications requiring high power or a high current density.

In addition, it is possible to reduce costs and solve a thermal imbalance between a stator and a rotor by being easily driven even if a low-end permanent magnet of a rotor is used.

Further, according to the present invention, it is possible to cool areas around an end coil of a drive motor at the same time by being designed to scatter cooling oil inside a rotor to the outside, and reduce the number of parts by removing cooling parts for cooling the existing stator, thereby reducing costs.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A rotor module with cooling structure, comprising:
a cylindrical rotor core with a hollow inside; and
a rotor shaft that is fitted and fixed to a center of the rotor core, includes a cooling fluid flow path filled with a cooling fluid therein, and rotates about a central axis of the rotor core,
wherein the rotor core includes a communication groove having a predetermined depth on an inner side surface,
the rotor shaft includes first discharge flow paths each having one end communicating with the cooling fluid flow path and the other end communicating with the rotor shaft and the communication groove of the rotor core,
the cooling fluid flow path has one end open and the other end closed, and
cross-sectional areas of the first discharge flow paths increase toward the other end.

2. The rotor module of claim 1, wherein the rotor core includes a second discharge flow path having a predetermined depth between one end surface and the other end surface and the rotor shaft.

3. The rotor module of claim 1, wherein the communication groove has a shape of a straight line to connect one end surface and the other end surface of the rotor core.

4. The rotor module of claim 1, wherein the communication groove is disposed outside a magnetic field area formed by a magnet of the rotor core.

5. The rotor module of claim 4, wherein the communication groove includes:
a first groove having a predetermined depth on a surface of an inner surface of the rotor core; and
a plurality of second grooves being in contact with the first groove and extending in a vertical direction of the first groove.

6. The rotor module of claim 1, wherein the first discharge flow paths are spaced apart from each other by a predetermined distance along the central axis of the rotor core.

7. The rotor module of claim 1, wherein a center of one of the first discharge flow paths is spaced apart from a center of the cooling fluid flow path by a predetermined distance in a vertical direction of the central axis of the rotor core.

8. The rotor module of claim 1, further comprising:
a cooling fluid injection unit that is fitted into the cooling fluid flow path of the rotor shaft to fill the cooling fluid inside the cooling fluid flow path.

9. The rotor module of claim 8, wherein the cooling fluid injection unit has a protruding part on an outer surface thereof to be in contact with an inner surface of the cooling fluid flow path,
a surface of the protruding part facing an outside of the cooling fluid flow path is perpendicular to the central axis of the rotor core, and
a surface of the protruding part facing an inside of the cooling fluid flow path is inclined by a predetermined angle rather than perpendicular or parallel to the central axis of the rotor core.

10. The rotor module of claim 9, wherein the protruding part includes a plurality of parts on the outer surface of the cooling fluid injection unit to be arranged in a row along the central axis of the rotor core.

11. The rotor module of claim 8, wherein the cooling fluid injection unit further includes a sealing part disposed between one end of the cooling fluid flow path.

12. A motor, comprising:
the rotor module of claim 1; and
a stator module that has the same axis with the rotor module and surrounds the rotor module.

13. A motor system, comprising:
the rotor module of claim 1;
a stator module that has the same axis with the rotor module and surrounds the rotor module; and
a cooling system that injects the cooling fluid through the cooling fluid flow path of the rotor module.

14. A rotor module with cooling structure, comprising:
a cylindrical rotor core with a hollow inside; and
a rotor shaft that is fitted and fixed to a center of the rotor core, includes a cooling fluid flow path filled with a cooling fluid therein, and rotates about a central axis of the rotor core,
wherein the rotor core includes a communication groove having a predetermined depth on an inner side surface,
the rotor shaft includes a first discharge flow path each having one end communicating with the cooling fluid flow path and the other end communicating with the rotor shaft and the communication groove of the rotor core, and
the cooling fluid flow path has one end open and the other end closed, and
wherein a center of the first discharge flow path is spaced apart from a center of the cooling fluid flow path by a predetermined distance in a vertical direction of both the central axis of the rotor core and a direction of extension of the first discharge flow path.

* * * * *